United States Patent [19]

Meinzer et al.

[11] Patent Number: 5,153,425
[45] Date of Patent: Oct. 6, 1992

[54] BROADBAND OPTICAL LIMITER WITH SACRIFICIAL MIRROR TO PREVENT IRRADIATION OF A SENSOR SYSTEM BY HIGH INTENSITY LASER RADIATION

[75] Inventors: Richard A. Meinzer, Glastonbury; Sallie S. Townsend, Manchester, both of Conn.

[73] Assignee: United Technologies Corporation, Hartford, Conn.

[21] Appl. No.: 633,554

[22] Filed: Dec. 24, 1990

[51] Int. Cl.⁵ .......................... H01J 3/14; G02F 1/00
[52] U.S. Cl. .................................. 250/216; 359/297
[58] Field of Search ............... 359/297; 250/216, 226, 250/229

[56] References Cited

U.S. PATENT DOCUMENTS

| | | | |
|---|---|---|---|
| 3,455,627 | 7/1969 | Letter | 359/297 |
| 3,602,576 | 8/1971 | Kohler et al. | 359/297 |
| 3,734,592 | 5/1973 | Sztankay et al. | 359/297 |
| 4,719,342 | 1/1988 | Cohn et al. | 359/297 |
| 4,917,481 | 4/1990 | Koechner | 359/297 |

*Primary Examiner*—David C. Nelms
*Assistant Examiner*—Michael Messinger
*Attorney, Agent, or Firm*—Terrance J. Radke

[57] ABSTRACT

A broadband optical limiter for use in combination with a sensor system is operative to prevent irradiation of the sensor system by laser radiation of unknown wavelengths having intensity levels sufficient to damage or disable the sensor system. The broadband optical limiter is further operative to throughput, with minimal optical distortion at wide angle fields of view, electromagnetic radiation in the operating spectral band(s) of the sensor system. The broadband optical limiter includes a flat or spherically shaped sacrificial mirror that is operative to reflect electromagnetic radiation in the operating spectral band(s) of the sensor system and to be optically machined, i.e., vaporized, by focused laser radiation of unknown wavelengths having intensity levels sufficient to damage or disable the sensor system to create a reflective dead spot. The reflective dead spot prevents the focused laser radiation from being throughputted to the sensor system. The broadband optical limiter further includes optical components to focus incident electromagnetic and laser raidation onto the sacrificial mirror, to turn incident electromagnetic and laser radiation out of the field of view of the sensor system, and to turn electromagnetic radiation reflected by the sacrificial mirror back into the field of view of the sensor system.

13 Claims, 6 Drawing Sheets

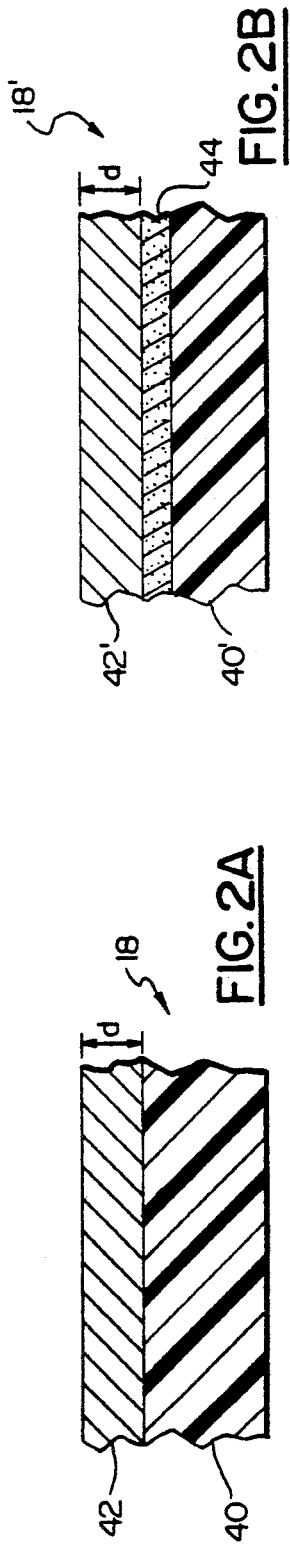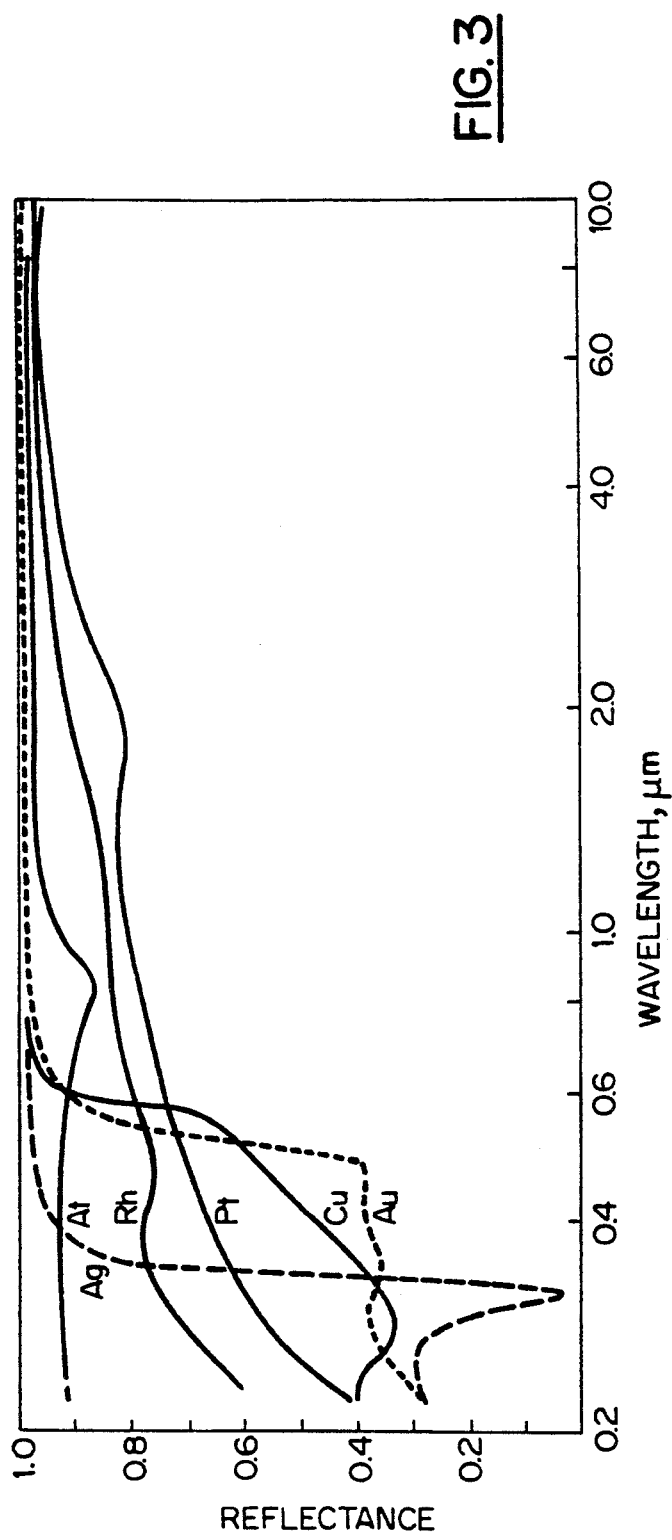

BROADBAND OPTICAL LIMITER WITH SACRIFICIAL MIRROR TO PREVENT IRRADIATION OF A SENSOR SYSTEM BY HIGH INTENSITY LASER RADIATION

TECHNICAL FIELD

The present invention relates to optical devices, and more particularly to a broadband optical limiter that prevents irradiation of sensor systems by laser radiation having intensity levels sufficient to damage the sensor system.

BACKGROUND OF THE INVENTION

Generally speaking, sensors are devices that are responsive to the presence and/or changes in value of a defined variable while sensor systems include functional elements in addition to the sensor that process the sensed variable to provide a utilitarian output. Optical sensor systems include sensors that are responsive to the optical region of the electromagnetic spectrum which broadly includes ultraviolet, visible, and infrared radiation. Optical sensor systems may be designed for various purposes such as detection of electromagnetic radiation, image formation, or image enhancement, and may be designed to be responsive to broad or narrow spectral bands of electromagnetic radiation.

Optical sensor systems such as infrared detectors and the human visual system are responsive to electromagnetic radiation in defined spectral bands, e.g., about 0.7–1.5 $\mu$m (near infrared), about 1.5–20 $\mu$m (intermediate infrared), about 20–1,000 $\mu$m (far infrared), or about 0.4–0.7 $\mu$m (visible), respectively. Optical sensor systems are typically configured to be responsive to electromagnetic radiation of certain intensity levels, and may be susceptible to damage or disablement if exposed to electromagnetic radiation of higher intensity levels.

Laser radiation comprises single frequency (or several discrete frequencies), high intensity electromagnetic waves in the optical region of the electromagnetic spectrum. Laser radiation may be encountered in many different environments from the laboratory to the battlefield. There is an increasing tendency to utilize the offensive capability of laser radiation, particularly in hostile environments, to disable or damage optical sensor systems.

Optical sensor systems such as infrared detectors or the human visual system may experience short or long term disablement if intentionally or accidentally subjected to laser irradiation of sufficient intensity levels. Such disabling effects may range from temporary blindness or inoperability of the sensor system to damage sufficient to render the system permanently inoperable.

A need exists to provide protection for optical sensor systems, including the human visual system, from the disabling effects of laser irradiation. While optical filters may provide such protection, optical filters are operative to provide protection only at specific wavelengths or spectral bands. Optical filters may prove satisfactory in the laboratory environment where the wavelength of laser radiation is a known quantity. In the battlefield environment, however, optical sensor systems may be exposed to laser radiation over a wide range of wavelengths. Under such conditions, the efficacy of optical filters may be marginal at best since the wavelengths of laser radiation will be unknown.

Moreover, many optical sensor systems are designed to be responsive to low intensity electromagnetic radiation in defined operating spectral bands. Such optical sensor systems are vulnerable to laser radiation in the operating spectral band(s) of the system. Optical filters cannot be used with such sensor systems since the optical filters would effectively filter out radiation the system was designed to be responsive to. A need exists, therefore, for a protective device for optical sensor systems which is wavelength independent, which prevents laser irradiation in the operating spectral band(s) of optical sensor systems, and which concomitantly allows optical sensor systems to function for their intended purpose within the operating spectral band(s).

In addition, the protective device should provide a field of view that is compatible with the field of view of the sensor system, i.e., the protective device should not reduce the field of view of the sensor system. Furthermore, the protective device should not optically distort the field of view of the sensor system.

The protective device should have a configuration that is compatible with existing as well as nascent sensor systems. The protective device should be configurable as a stand alone unit that may be integrated with existing sensor systems, or configurable as a unit that may be integrally incorporated in the optical train of nascent sensor systems.

DISCLOSURE OF THE INVENTION

One object of the present invention is to provide a broadband optical limiter that is operative to provide a high throughput of electromagnetic radiation in the operating spectral band(s) of an associated sensor system while simultaneously preventing CW or pulsed laser radiation in the same spectral band(s), having intensity levels sufficient to damage the associated sensor system, from irradiating the associated sensor system.

Another object of the present invention is to provide a broadband optical limiter that is responsive to a wide range of CW or pulsed laser radiation of unknown wavelengths.

Still another object of the present invention is to provide a broadband optical limiter that is compatible with the field of view of the associated sensor system.

A further object of the present invention is to provide a broadband optical limiter having a configuration that is adaptable wherein the broadband optical limiter may be disposed in combination with the associated sensor system as a stand alone unit or as an integral part of the optical train of the sensor system.

Yet a further object of the present invention is to provide a broadband optical limiter having a high degree of reliability.

The broadband optical limiter according to the present invention provides a high throughput of electromagnetic radiation in the operating spectral band(s) of an associated sensor system while simultaneously preventing laser radiation of unknown wavelengths and having intensity levels exceeding the damage threshold of the associated sensor system from irradiating the associated sensor system. The optical limiter may be configured as a stand alone device for use in combination with the sensor system or may be incorporated within the optical train of a sensor system.

One embodiment of the broadband optical limiter according to the present invention has an optical train that includes aperture and exit lenses, first and second reflective members, and a sacrificial mirror having a predetermined activation threshold. The sacrificial mirror may be spherically-shaped for applications requiring a relatively wide field of view or may be flat for those applications where a relatively narrow field of view is sufficient.

The aperture lens is operative, in combination with the first reflective member, to focus incident radiation, including laser radiation, onto the sacrificial mirror. Operation of the optical limiter over a broad spectral band may be achieved by proper design of the aperture lens. The first reflective member is operative to turn incident radiation, including laser radiation, out of the field of view of the sensor system.

The sacrificial mirror of the present invention is bi-functional. For electromagnetic radiation having intensity levels less than the damage threshold of the associated sensor system, the sacrificial mirror is operative to reflect the focused radiation towards the second reflective member. The second reflective member is operative to turn the reflected radiation back into the field of view of the sensor system. The exit lens may be used to collimate radiation reflected from the second reflective member for transmission to the sensor system.

Laser radiation incident upon the optical limiter having intensity levels equal to or exceeding the damage threshold of the sensor system is focused and turned in the manner discussed hereinabove. Such laser radiation, when focused, will have intensity levels that exceed the predetermined activation threshold of the sacrificial mirror. Such laser radiation will optically machine the sacrificial mirror, i.e., vaporize the sacrificial mirror to form a hole therethrough. The optically machined hole is a reflective dead spot that does not reflect focused radiation.

Therefore, focused laser radiation that optically machines the sacrificial mirror is not reflected therefrom, and consequently, does not irradiate the associated sensor system. The reflective dead spot has minimal dimensions, and in consequence, the sacrificial mirror will still be operative to throughput electromagnetic radiation within the operating spectral band(s) of the associated sensor system even after being optically machined.

A repositioning means may be disposed in combination with the sacrificial mirror. The repositioning means is operative to reposition the sacrificial mirror after optical machining by focused laser radiation to remove the reflective dead spot from the optical path of the broadband optical limiter. Removal of the reflective dead spot eliminates any optical distortion arising from the reflective dead spot.

A detection/alarm device may be positioned behind the sacrificial mirror to detect any focused laser radiation that optically machines the sacrificial mirror. The device may provide an alarm signal that indicates that the broadband optical limiter was subjected to laser radiation above the damage threshold of the associated sensor system.

The sacrificial mirror of the present invention is a hybrid structure comprising a substrate having a metallic coating applied to one surface thereof. The substrate is preferably formed from plastics such as phenolics, polystyrenes, vinylidene chloride, polycarbonates, or polypropylenes. Aluminum foil may also be used as the substrate.

Various materials such as gold, bismuth, silver, platinum, and chromium may be utilized for the metallic coating. The choice of material for the metallic coating depends upon various factors including the vaporization temperature of the material, the heat capacity of the material, the optical absorptivity of the material, the reflectivity of the material, the technique utilized in applying the metallic coating to the substrate, the response time, the intended orientation of the sacrificial mirror in the optical train of the broadband optical limiter, and the function, operating spectral band(s), and damage threshold of the associated sensor system.

The activation threshold of the sacrificial mirror, i.e., the energy level at which optical machining will occur, depends not only upon the damage threshold of the associated sensor system, but also the optical gain of the broadband optical limiter. Laser radiation focused by the broadband optical limiter will have intensity levels several magnitudes greater than the intensity level of such laser radiation when incident upon the broadband optical limiter. The sacrificial mirror is designed to have an activation threshold that is operative in response to incident laser radiation having intensity levels less than the damage threshold of the associated sensor system.

The embodiment of the broadband optical limiter described hereinabove has an optical train comprised of a combination of transmissive and reflective optical components. The broadband optical limiter of the present invention may utilize reflective optical components such as spherical, parabolic, and/or toroidal mirrors. The optical limiter may also utilize optical gratings.

The foregoing and other features and advantages of the present invention will become more apparent from the following description and accompanying drawings.

BRIEF DESCRIPTION OF THE DRAWINGS

FIG. 2A is a partial cross-sectional view of one embodiment of a sacrificial mirror illustrating the hybrid configuration thereof.

FIG. 2B is a partial cross-sectional view of another embodiment of a sacrificial mirror.

FIG. 3 is a graph illustrating reflectance versus wavelength for several metallic elements.

BEST MODE FOR CARRYING OUT THE INVENTION

Figure 1:
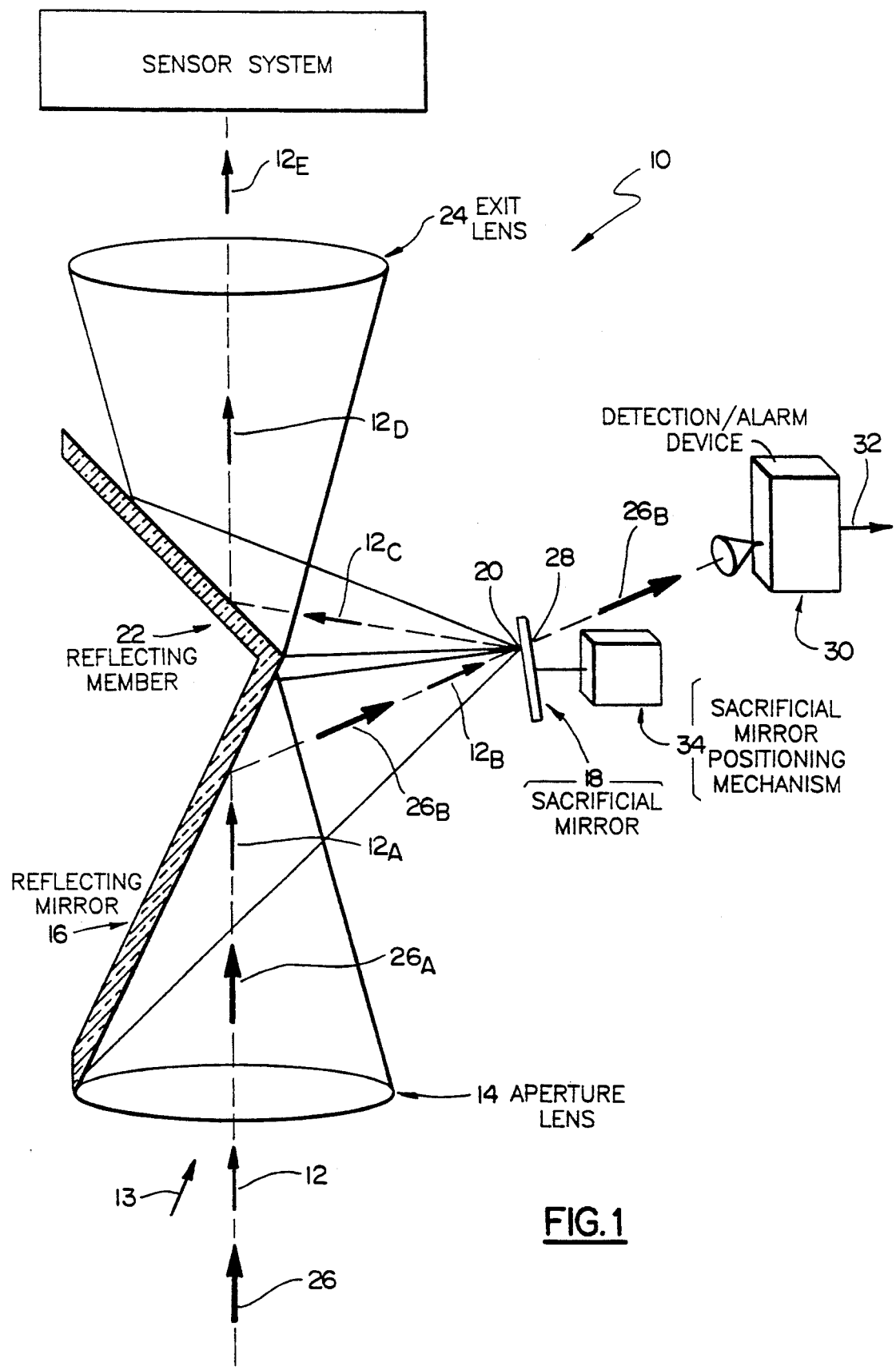
FIG. 1 is a plan view of one embodiment of a broadband optical limiter according to the present invention.

Referring to the drawings wherein like reference numerals identify corresponding or similar elements throughout the several views, one embodiment of a broadband optical limiter 10 according to the present invention is illustrated in FIG. 1. The optical limiter 10 illustrated is a stand alone unit configured for disposition in combination with a sensor system SS.

As used herein, sensor system is a term that encompasses devices or instruments that are responsive to electromagnetic radiation within the optical spectral band which includes ultraviolet radiation (about 0.19–0.4 μm), visible light (about 0.4–0.7 μm) and/or infrared radiation (about 0.7–1,000 μm). The term includes various functional systems such as radiation detection systems, radiation imaging systems, and image enhancement systems. Sensor system as used herein also encompasses the human visual system.

The stand alone broadband optical limiter 10 is configured to be interposed between the aperture (not shown) of the sensor system SS and the field of view of the sensor system SS. The stand alone broadband optical limiter 10 may be configured as goggles to protect the human visual system, or may be incorporated in combination with image generation systems such as ship/tank sighting devices or image enhancement systems such as night vision goggles.

The optical limiter 10 of the present invention is operative to throughput, i.e., transmit, radiation within the operating spectral band(s) of the associated sensor system SS so that the system is capable of performing its intended function, i.e., responding to and processing radiation within its operating spectral band(s). Concomitantly, the optical limiter 10 is operative to neutralize laser radiation of unknown wavelengths which exceeds the intensity design limits of the associated sensor system SS so that such laser radiation does not irradiate the associated sensor system SS.

As used herein, the terminology "laser radiation" is generally intended to encompass single frequency (or several discrete frequencies), high intensity electromagnetic waves in the optical region of the electromagnetic spectrum. Since the broadband optical limiter 10 according to the present invention is designed to be bifunctionally responsive to radiation intensity levels, i.e., $W/cm^2$, as described hereinbelow in further detail, it is to be understood that the terminology "laser radiation" may also encompass electromagnetic radiation such as visible or infrared radiation having an intensity level equal to or greater than the damage threshold or intensity design limits of the associated sensor system SS.

The embodiment of the broadband optical limiter 10 exemplarily illustrated in FIG. 1 has an optical train that includes an aperture lens 14, first and second reflective members 16, 22, a sacrificial mirror 18, and an exit lens 24. Incident radiation 12 within the intensity design limits of the sensor system SS is focused by means of the aperture lens 14. For sensor systems SS operative over a relatively wide spectral band, e.g., the visible light spectrum, the aperture lens 14 may be achromatic to negate lens dispersion effects over the operating spectral band(s).

Broadband operation of the optical limiter 10 may be achieved by proper design of the aperture lens 14. For example, for sensor systems SS responsive to radiation from the visible into the intermediate infrared spectral bands, the aperture lens 14 may be a ZnSe lens which is operative to transmit/focus radiation from the visible through the intermediate infrared spectrum (about 0.4 to about 12 μm).

Concomitantly, the radiation $12_A$ being focused is turned out of the field of view of the aperture (not shown) of the sensor system SS by means of the first reflective member 16. The aperture lens 14 and the first reflective member 16 in combination are operative to focus the radiation $12_B$ at a spot 20 on the sacrificial mirror 18.

As discussed in further detail hereinbelow, the sacrificial mirror 18 is designed to have a predetermined activation threshold. The activation threshold is based upon the damage threshold (maximum intensity design limit) of the sensor of the sensor system SS. For focused radiation $12_B$ having intensity levels below the activation threshold of the sacrificial mirror 18, the sacrificial mirror 18 functions as a reflective member to reflect the radiation $12_C$ towards the second reflective member 22.

The second reflective member 22 is operative to turn the radiation $12_C$ back into the field of view of the aperture of the sensor system SS. The radiation $12_D$ reflected from the second reflective member 22 is incident upon the exit lens 24. The exit lens 24 is operative to collimate incident radiation so that collimated radiation $12_E$ is transmitted to the sensor system SS.

Incident laser radiation 26 is simultaneously focused and turned by the combination of the aperture lens 14 and the first reflective member 16 in the manner discussed hereinabove. Focused laser radiation $26_B$ having an intensity level that equals or exceeds the predetermined activation threshold of the sacrificial mirror 18, however, is not reflected by the sacrificial mirror 18. Rather, such focused laser radiation $26_B$ has an intensity level sufficient to optically machine a hole 28 in the sacrificial mirror 18, i.e., vaporize a hole therethrough. Thus, laser radiation 26 having an intensity level sufficient to cause damage to the associated sensor system SS is not reflected by the sacrificial mirror 18, and consequently, cannot irradiate the associated sensor system SS. Focused laser radiation having an intensity level equal to or greater than the activation threshold of the sacrificial mirror 18 is not throughputted by the broadband optical limiter 10 according to the present invention.

A detection/alarm device 30 may be positioned behind the sacrificial mirror 18. Laser radiation $26_B$ having sufficient intensity to optically machine the sacrificial mirror 18 will be transmitted through the sacrificial mirror 18 and impinge upon the detection device 30, which generates an alarm signal 32 as a result of the impingement of laser radiation $26_B$. The alarm signal 32 provides an indication that the broadband optical limiter 10 was subjected to focused laser radiation 26 above the activation threshold of the sacrificial mirror 18.

The optically machined hole 28 defines a reflective dead spot in the sacrificial mirror 18. Due to the small dimensions of the reflective dead spot 28, the sacrificial mirror 18 will still be operative to throughput radiation to the sensor system SS. As illustrated in FIG. 1, radiation 13 incident upon the broadband optical limiter 10 at other angles, i.e., different from incident radiation 12, will be transmitted through the optical limiter 10 to the sensor system SS since the combination of the aperture lens 14 and the first reflective member 16 will focus the radiation 13 on the sacrificial mirror 18 at a spot other than the reflective dead spot 28. Such focused electromagnetic radiation will be reflected by the sacrificial mirror 18.

Therefore, electromagnetic radiation in the operating specral band(s) of the sensor system SS incident upon the broadband optical limiter 10 at other angles will be throughputted to the sensor system SS. This permits continued operation of the sensor system SS. It will be appreciated, however, that there will be some optical distortion of the field of view of the sensor system SS due to the reflective dead spot 28 in the sacrificial mirror 18.

Depending upon the intended function of the sensor system SS, a means 34 such as a ratcheting or rotating mechanism may be disposed in combination with an array of sacrificial mirrors 18 to counteract any optical distortion arising from the reflective dead spot 28. The means 34 is operative, upon cessation of irradiation of the broadband optical limiter 10 by laser radiation 26, to reposition the array of sacrificial mirrors 18 so that reflective dead spot 28 is removed from the optical field of view of the broadband optical limiter 10, i.e., an unmachined sacrificial mirror 18 is positioned in the focal plane of the optical path of the broadband optical limiter 10. The means 34 may be interconnected to the detection/alarm device 30 so that cessation of irradiating laser radiation $26_B$ causes the means 34 to automatically operate to reposition the sacrificial mirror 18 array.

The sacrificial mirror 18 of the present invention is a hybrid structure consisting of a substrate 40 having a metallic coating 42 applied thereto as illustrated in FIG. 2A. The hybrid structure 18 should be fabricated to be optically flat so as to minimize optical distortion of electromagnetic radiation throughputted by the broadband optical limiter 10. By way of example only, hybrid structures 18 having optical flatnesses of about 1/10 wavelength or better in the infrared spectral band and about ¼ wavelength or better in the visible spectral band should be sufficient to provide minimal optical distortion for broadband optical limiters 10 according to the present invention.

Preferably the substrate 40 is a plastic film formed from plastic material that has a relatively low value for the parameter $p_2c_2k_2$, where $p_2$ is the density of the plastic material, $c_2$ is the heat capacity of the plastic material, and $k_2$ is the thermal conductivity of the plastic material (operation of the sacrificial mirror 18 appears to be independent of thickness of the substrate 40 for thin plastic substrates 40). Examples of plastic materials having relatively low values of $p_2c_2k_2$ include phenolics ($p_2c_2k_2=0.15$), polystyrenes ($p_2c_2k_2=0.28$), vinylidene chloride ($p_2c_2k_2=0.35$), polycarbonates ($p_2c_2k_2=0.48$), and polypropylenes ($p_2c_2k_2=0.49$). The technology is not presently available for cost effective formation of thin plastic films from phenolics and polystyrenes, but thin plastic films may be readily formed from vinylidene chloride. For example, a thin vinylidene chloride film (about 13 $\mu$m) may be stretched over a first annular member, locked in the stretched condition by an overfitting second annular member, and heated to form a very flat tight membrane which is subsequently coated with a metallic material as discussed hereinbelow. In addition to plastic films, a thin metallic material such as aluminum foil has also been found to perform satisfactorily as the substrate 40.

The choice of material for the metallic coating 42 is based upon several factors. These factors include the vaporization temperature of the material, the heat capacity of the material, the optical absorptivity of the material, and the reflectivity of the material. For convenience, several of these factors have been grouped to define a parameter labelled as the film damage parameter (fdp), $T/p_1c_1A$, where T is the vaporization temperature of the material, $p_1$ is the density of the material, $c_1$ is the heat capacity of the material, and A is the optical absorptivity of the material. Other factors impacting the choice of material selection include the thickness (d) of the metallic coating 42, the technique for applying the metallic coating 42 to the substrate 40, and the response time, i.e., the time required to optically machine through the sacrificial mirror 18. The function, operating spectral band(s), and damage threshold of the associated sensor system SS are also factors for consideration. Some of the factors affecting selection of the material for the metallic coating 42 are interrelated such that tradeoffs may be necessary, i.e., optimization of all of the various factors may not be possible.

The sacrificial mirror 18 should provide good optical throughput for radiation in the operating spectral band(s) of the sensor system SS. To optimize throughput to the associated sensor system SS, the metallic coating 42 should provide relatively uniform reflectivity across the operating spectral band(s) of interest. For example, with reference to FIG. 3, gold (Au) has a high, uniform reflectivity for wavelengths greater than about 0.8 $\mu$m, making it suitable for the infrared spectral band, while silver (Ag), and to a lesser extent aluminum (Al), have reflectivities suitable for the visible spectral band.

Concomitantly, the metallic coating 42 should be optically machinable by laser radiation having an intensity level equal to or greater than the damage threshold of the sensor system SS. In general, metallic materials having relatively high absorptivities are more easily optically machined since a greater percentage of the focused laser radiation is being utilized (absorbed) to vaporize (optically machine) the sacrificial mirror 18. The sensitivity of the sacrificial mirror 18, i.e., responsiveness to lower intensity levels of laser radiation, may be increased by utilizing metallic coatings 42 having higher absorptivities.

Metallic coatings 42 having high absorptivities, however, have lower reflectance values, and therefore, some accommodation between reflectance and absorptivity may be necessary. The absorptivity of the substrate 40 may be utilized to compensate for decreases in absorptivity of the metallic coating 42 in certain spectral bands.

It has also been determined that the technique utilized to apply the metallic coating 42 onto the substrate 40 may affect the sensitivity of the sacrificial mirror 18. A number of sacrificial mirrors 18 were formed by applying various metallic coatings 42 (thicknesses of about 100 to about 1,000 Å) onto vinylidene chloride substrates 40 by different techniques. The mirrors 18 were then tested by being irradiated by a CW HeNe laser. The results are illustrated in FIG. 4 which shows the relative intensities needed to optically machine a hole through the various sacrificial mirrors 18 formed by metal coating techniques such as laser evaporation (solid figures), ion sputtering (open figures), and electron sputtering (half-solid figures).

Figure 4:
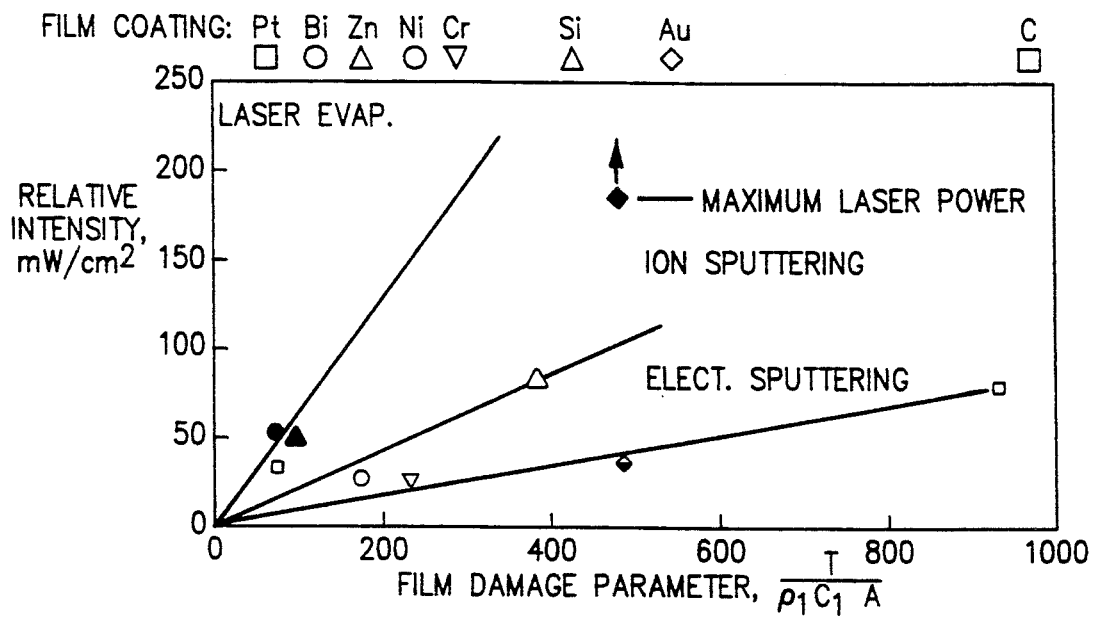
FIG. 4 is a graph illustrating the dependence of sacrificial mirror sensitivity on coating technique with the sacrificial mirror orientated for irradiation of the metallic coating.

A given metallic coating 42 has a constant film damage parameter, $T/p_1c_1A$, such that the effect of the various coating techniques may be determined by projecting a line upwardly from the abscissa of FIG. 4. An examination of FIG. 4 shows that the application of a metallic material 42 to a plastic film by electron sputtering generally produces the most sensitive sacrificial mirrors 18 while laser evaporation generally produces the least sensitive sacrificial mirrors 18. It is interesting to note that the gold-plated vinylidene chloride mirror 18 formed by laser evaporation could not be optically machined with the maximum available power of the HeNe laser while the gold-plated vinylidene chloride mirror 18 formed by electron sputtering was optically machined at about 40 mW/cm$^2$.

In addition to forming the hybrid structure 18 by applying a metallic coating 42 to a flat, tight plastic membrane 40 as discussed hereinabove, alternative procedures may be used. Another method would entail the fabrication of a relatively thick plastic substrate 40 by conventional techniques such as molding. The substrate 40 would then be optically polished to achieve a desired optical flatness. A metallic coating 42 would be applied by one of the foregoing techniques. The substrate 40 may then be etched to achieve a desired thickness. Optionally, the substrate 40 may be latticed to achieve the desired thickness while maintaining the structural strength thereof.

A variant of the hybrid structure described hereinabove may also be utilized as a sacrificial mirror 18. A commercially available mirror may be used as a mandrel or substrate 40' and coated with a layer of carbon (carbon has an absorptivity of 1.0 and a vaporization temperature of about 3550° C.). The carbon layer 44 would be overcoated with a metallic coating 42' to form the hybrid structure 18' illustrated in FIG. 2B. During laser irradiation, the metallic coating 42' would be vaporized, i.e., optically machined, in the manner discussed hereinabove. The carbon layer 44 would absorb the laser radiation due to its absorptivity, thereby preventing laser irradiation of the associated sensor system SS.

Figure 5:
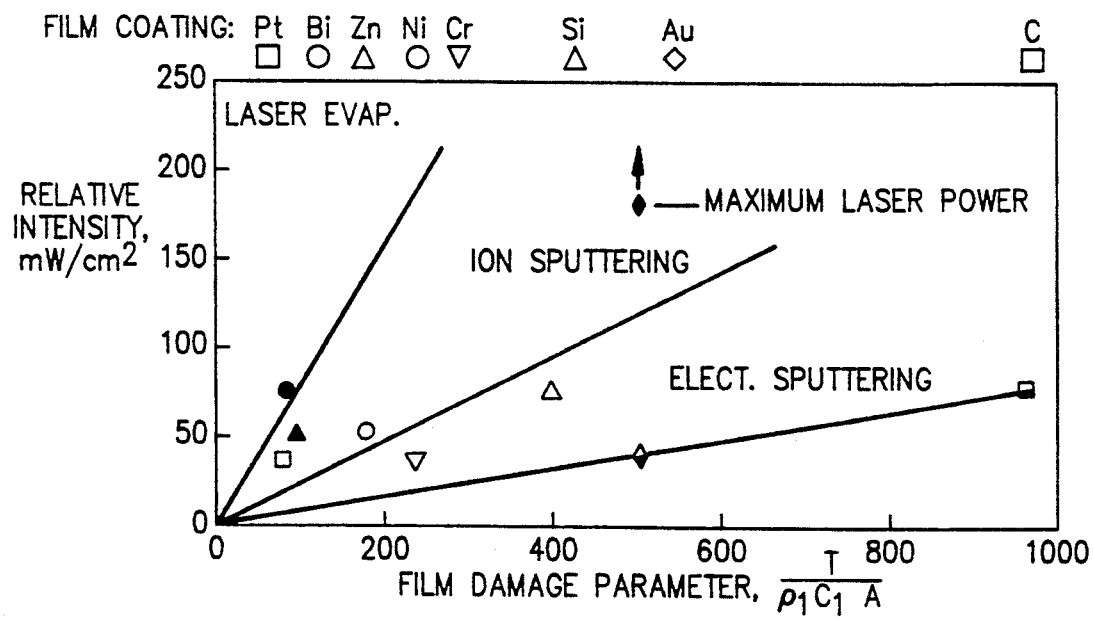
FIG. 5 is a graph illustrating the dependence of sacrificial mirror sensitivity on coating technique with the sacrificial mirror orientated for irradiation of the substrate.

The sacrificial mirror 18 is positioned in the optical path of the broadband optical limiter 10 at the focal plane thereof, as illustrated in FIG. 1. It has been determined that the orientation of the sacrificial mirror 18 may affect the sensitivity of the mirror 18 to focused laser radiation. FIG. 4 illustrates the relative intensities needed to optically machine a hole through various sacrificial mirrors 18 that were orientated so that the metallic coating 42 of the sacrificial mirror 18 was irradiated. FIG. 5 illustrates the relative intensities needed to optically machine a hole through various sacrificial mirrors 18 that were orientated for substrate 40 (vinylidene chloride) irradiation. Based upon these limited test results, it appears that the sacrificial mirrors 18 should be orientated so that the metallic coating 42 is part of the optical pathway of the broadband optical limiter 10 to produce a more sensitive broadband optical limiter 10.

An examination of FIGS. 4 and 5 shows that various metallic materials have utility in the formation of metallic coatings 42 for sacrificial mirrors 18. Metallic materials such as gold, nickel, chromium, and bismuth provide comparable sensitivities to focused laser radiation. It will be appreciated, however, that metallic materials other than those specifically tested may have utility in forming metallic coatings 42 for sacrificial mirrors 18. In addition, metallic coatings 42 formed from a mix of two or more metallic materials have also shown utility for sacrificial mirrors 18 for broadband optical limiters 10.

Figure 6:
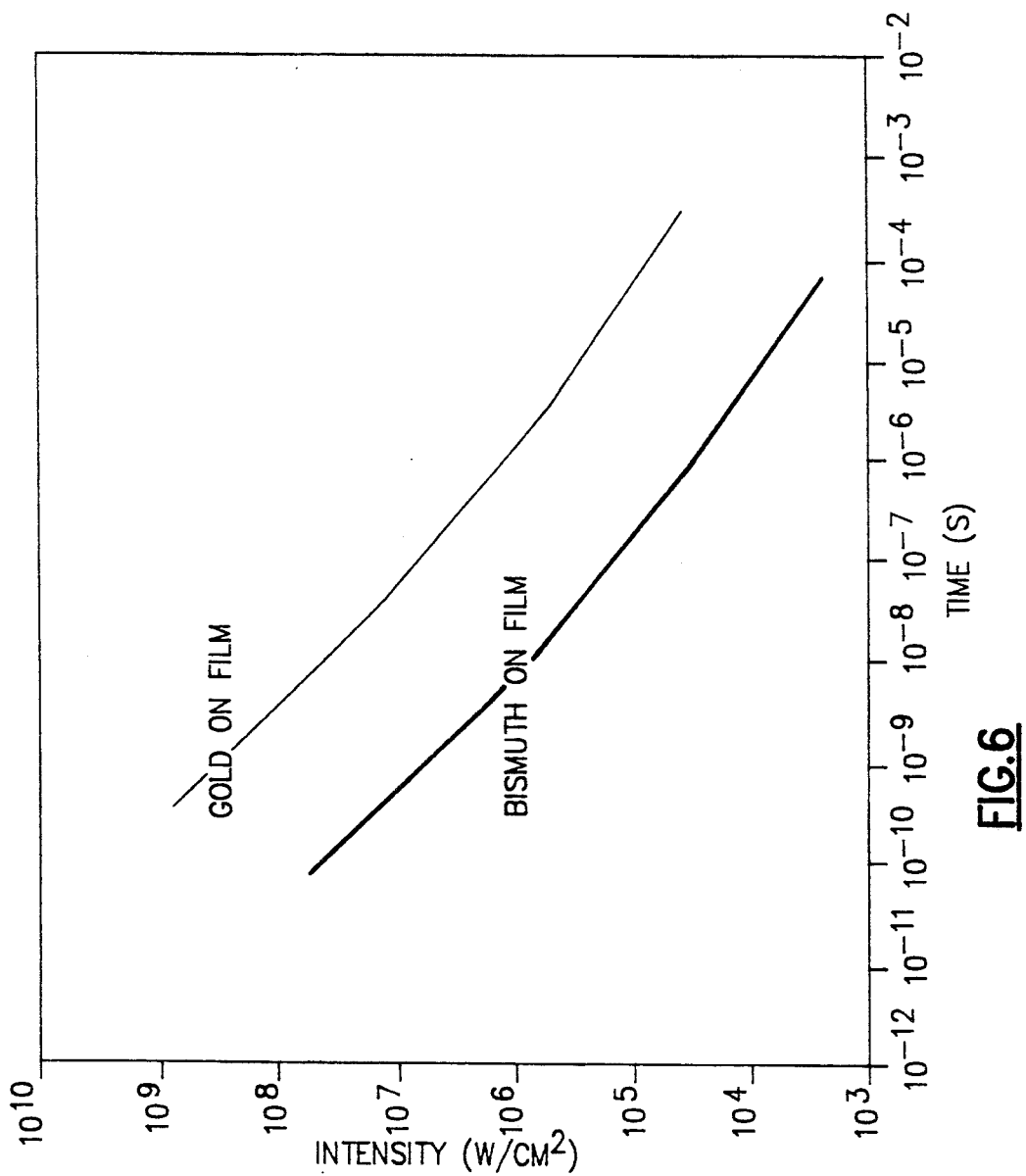
FIG. 6 is a plot of activation thresholds versus response times for a gold-coated and bismuth-coated sacrificial mirrors according to the present invention.

The metallic material selected for the metallic coating 42 may also effect the response time of the sacrificial mirror 18, i.e., the time required to optically machine the sacrificial mirror 18 at a given intensity level. FIG. 6 is a plot comparing activation thresholds versus response times for sacrificial mirrors 18 having a gold coating 42 and bismuth coating 42. At any activation threshold, FIG. 6 shows that the response time of the bismuth-coated mirror 18 is faster than the gold-coated mirror 18. While bismuth has a lower vaporization temperature than gold (1560° C. versus 2966° C.), and a higher absorptivity than gold (0.39 versus 0.057), there does not appear to be a hard and fast correlation between these factors, and the resultant sensitivity of the sacrificial mirror 18. As FIG. 6 illustrates, higher intensity level laser radiation produces faster response times. Faster response times preclude possible irradiation of the sensor system SS during the response period when the sacrificial mirror 18 is being optically machined.

In addition to the damage threshold of the sensor system SS, the activation threshold of the sacrificial mirror 18 depends upon the optical gain of the broadband optical limiter 10. Since the broadband optical limiter 10 of the present invention is operative to focus irradiating laser radiation at the focal plane of the optical limiter 10, i.e., on the sacrificial mirror 18, it will be appreciated that the focused laser radiation will have an intensity level several magnitudes greater than the laser radiation irradiating the optical limiter 10. The optical gain, G, of the broadband optical limiter 10 may be defined as the ratio of the intensity level of the focused laser radiation to the intensity level of the irradiating laser radiation.

Figure 7:
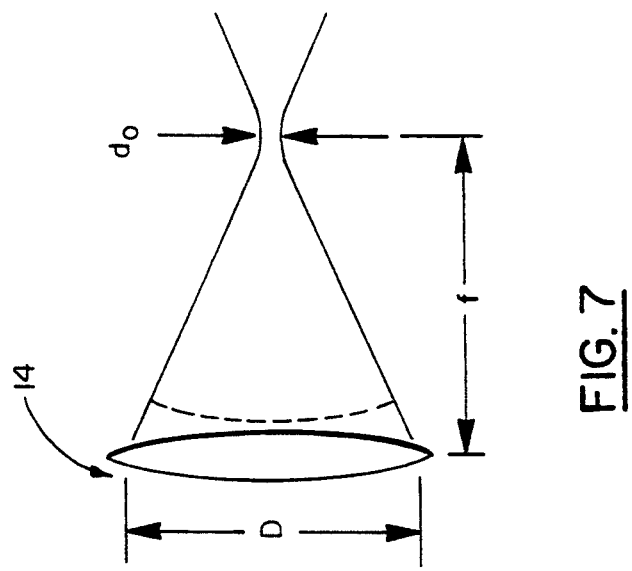
FIG. 7 is a schematic illustrating the focusing mechanics of the broadband optical limiter.

The squared ratio of the area of the irradiating laser radiation to the area of the focused laser radiation may be used to derive the optical gain, G, of the optical limiter 10. The area of the irradiating laser radiation is based upon the diameter, D, of the aperture lens 14 (assuming irradiation of the entire aperture lens 14). With reference to FIG. 7, the diameter, $d_o$, of the focused laser radiation may be approximated by $(2f\lambda)/D$, where f and D are the focal length and diameter, respectively, of the aperture lens 14 and $\lambda$ is the wavelength of the irradiating laser radiation. Simplifying, the optical gain G for the broadband optical limiter 10 may be defined by $(D/d_o)^2$. In designing the aperture lens 14 for the broadband optical limiter 10, consideration should be given to the fact that the intensity of laser radiation decreases by an order of magnitude when the focal distance is changed by three times the Rayleigh range, $Z_r$ where $Z_r \pi \lambda (f/D)^2$.

As disclosed above, the damage threshold of the sensor system SS is based upon the intensity level of laser radiation that will temporarily or permanently disable the sensor system SS. For example, laser radiation having an intensity level of about 0.01 W/cm$^2$ will cause damage to the human visual system. The damage threshold of the sensor system SS associated with the broadband optical limiter 10 will be a known quantity, e.g., the damage threshold of the human visual system. The known damage threshold is correlated with the optical gain, G, of the broadband optical limiter 10 to define the activation threshold of the sacrificial mirror 18.

For example, for a broadband optical limiter 10 wherein $f/D=2$, D=2 cm, and wherein the irradiating laser radiation has a wavelength $\lambda = 600$ nm, the optical gain, G, of the optical limiter 10 is about $6.94 \times 10^7$. For an intensity threshold of 0.01 W/cm², corresponding intensity at the sacrificial mirror 18 for a broadband optical limiter 10 having an optical gain, G, of about $6.94 \times 10^7$ is approximately $6.94 \times 10^5$ W/cm² (for laser radiation at 600 nm). Other examples of sacrificial mirror intensities for different sized aperture lenses 14 are presented in Table 1.

| Aperture Lens (D-in) | Intensity of Irradiating Laser | Optical Gain | Intensity at Sacrificial Mirror |
|---|---|---|---|
| 1 | 0.01 W/cm² | $1.1 \times 10^8$ | $1.1 \times 10^6$ W/cm² |
| 2 | 0.01 W/cm² | $4.5 \times 10^8$ | $4.5 \times 10^6$ W/cm² |
| 3 | 0.01 W/cm² | $1.0 \times 10^9$ | $1.0 \times 10^7$ W/cm² |
| 6 | 0.01 W/cm² | $4.0 \times 10^9$ | $4.0 \times 10^7$ W/cm² |

As a preliminary approximation of the activation threshold for a broadband optical limiter 10, the intensity level of the focused laser radiation may be approximated as being about a factor of $10^6$–$10^7$ more intense than the intensity level of the irradiating laser radiation.

As discussed in the preceding paragraphs, the damage threshold of the associated sensor system SS is correlated with the optical gain, G, of the broadband optical limiter 10 to define the activation threshold of the sacrificial mirror 18. As a practical matter, however, the sacrificial mirror 18 should be designed to have an activation threshold that corresponds to an intensity level for incident radiation that is less than the damage threshold of the associated sensor system SS. This provides the broadband optical limiter with a built-in safety factor, i.e., optical machining will occur at focused laser radiation intensity levels below the corresponding damage threshold of the associated sensor system SS.

The performance characteristics of the broadband optical limiter 10 according to the present invention depend upon the quality and type of optical components forming the optical train of the optical limiter 10. For example, use of an achromatic aperture lens 14 negates lens dispersion effects, thereby minimizing optical distortion of electromagnetic radiation transmitted to the sensor system SS. Broadband operation may be achieved by utilizing a ZnSe aperture lens 14 that transmits electromagnetic radiation in the visible spectral band up through a portion of the intermediate infrared spectral band (about 12 μm). An aperture lens 14 fabricated from BK 7 glass, in contrast, only transmits electromagnetic radiation from the visible spectrum up to about 2.5 μm.

The embodiment of the broadband optical limiter 10 described hereinabove utilized a structurally flat sacrificial mirror 18. It will be appreciated that a structurally flat sacrificial mirror 18 provides a relatively narrow field of view. For some applications, i.e., sensor system SS functions, a structurally flat sacrificial mirror 18 may provide a sufficient field of view. For example, for sensor systems SS that are utilized for radiation detection, a narrow field of view may be appropriate. For other sensor system SS applications, e.g., image formation or image enhancement, a relatively wide angular field of view is preferred.

Figure 8A:
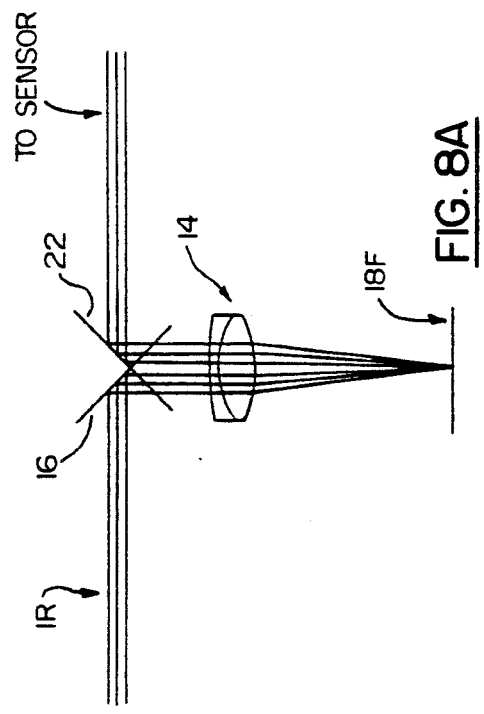
FIGS. 8A, 8B illustrate the optical paths for another embodiment of the broadband optical limiter of the present invention.
Figure 8B:
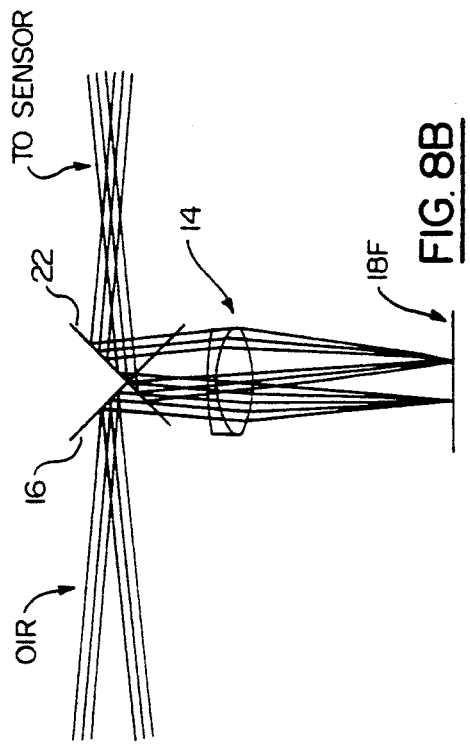

With reference to FIGS. 8A, 8B, the effects of a structurally flat sacrificial mirror 18F are illustrated.

Figure 9A:
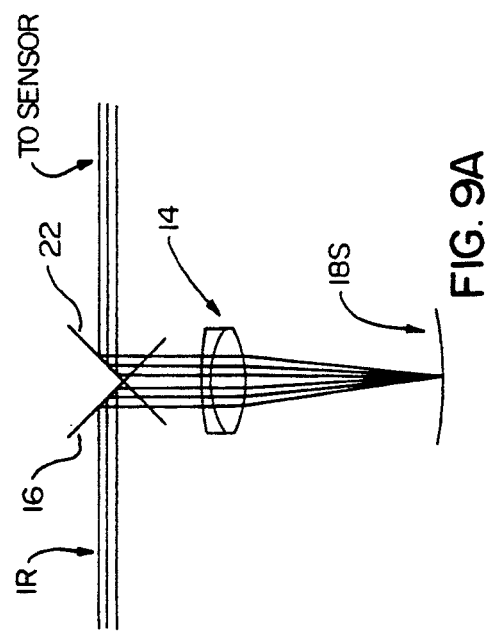
FIGS. 9A, 9B illustrate the optical paths for yet another embodiment of the broadband optical limiter of the present invention.
Figure 9B:
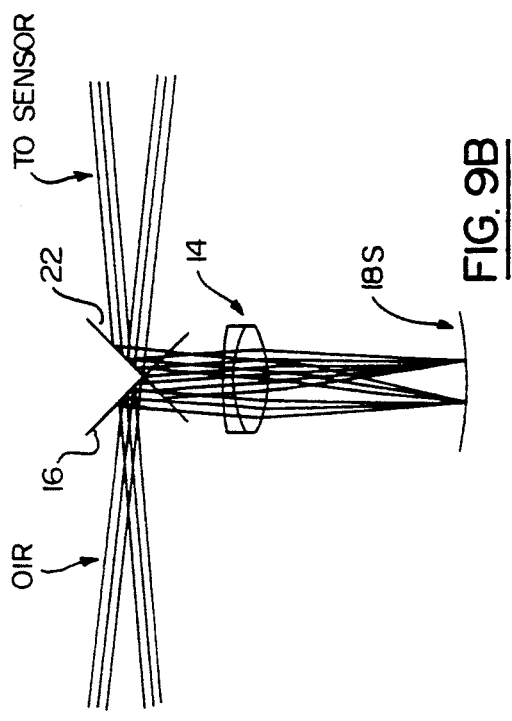

Radiation IR incident along the optical axis of the optical limiter 10 is not affected, as shown in FIG. 8A. Examining FIG. 8B, it is apparent that the field of view for off-axis incident radiation OIR is reduced. The effect of substituting a spherically-shaped sacrificial mirror 18S is illustrated in FIGS. 9A, 9B. A spherically-shaped sacrificial mirror 18S provides an expanded angular field of view.

Figure 10:
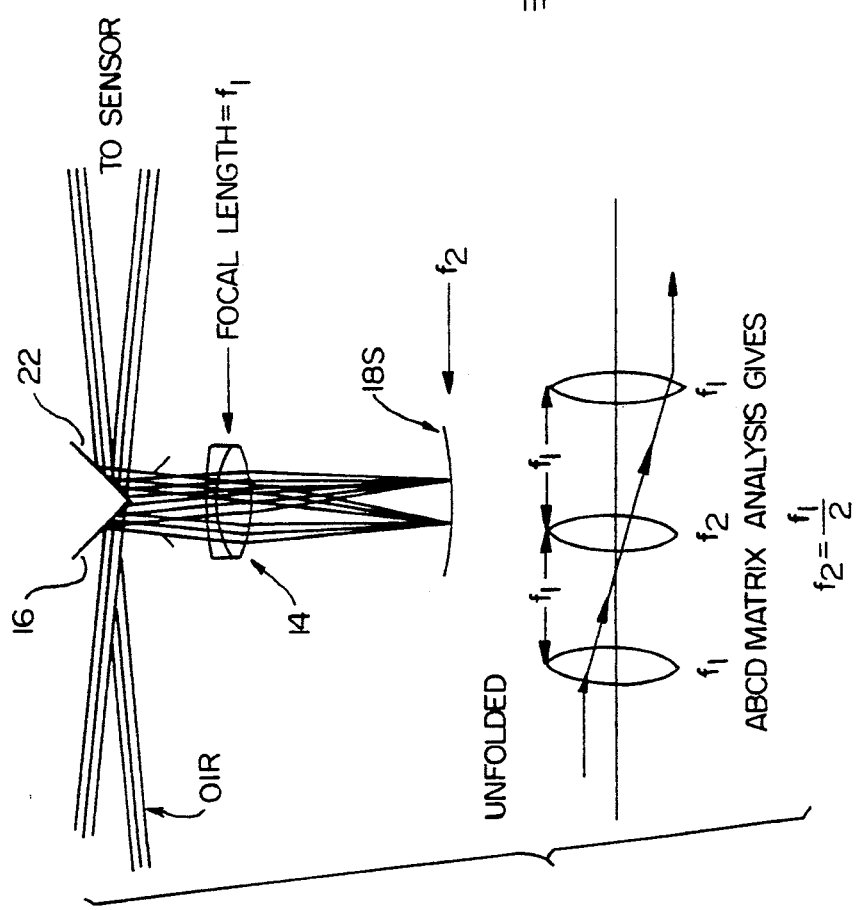
FIG. 10 is a plan view of an unfolded lens system for the broadband optical limiter of FIG. 9B.

Analytic analysis of the optics of the broadband optical limiter can be performed using ABCD matrices. For the optical configurations illustrated in FIGS. 8 and 9, the optics can be unfolded as illustrated in FIG. 10. The propagation matrix is given by:

$$K = \begin{pmatrix} 1 & 0 \\ -\frac{1}{f_1} & 1 \end{pmatrix} \begin{pmatrix} 0 & f_1 \\ 0 & 1 \end{pmatrix} \begin{pmatrix} 1 & 0 \\ -\frac{1}{f_1} & 1 \end{pmatrix} \begin{pmatrix} 1 & f_1 \\ 0 & 1 \end{pmatrix} \begin{pmatrix} 1 & 0 \\ -\frac{1}{f_1} & 1 \end{pmatrix} \quad (1)$$

$$\begin{pmatrix} -1 & f_1\left(2 - \frac{f_1}{f_2}\right) \\ 0 & -1 \end{pmatrix} = \begin{pmatrix} -1 & 0 \\ 0 & -1 \end{pmatrix} \text{ when } f_2 = \frac{f_1}{2} \quad (2)$$

The reflective members flip the beam so that the propagation matrix becomes the identity matrix, which shows that the broadband optical limiter according to the present invention is paraxially transparent, i.e., the input beam is imaged 1:1 to the output of the optical limiter.

$$K = \begin{pmatrix} 1 & 0 \\ 0 & 1 \end{pmatrix} \quad (3)$$

The foregoing calculation is valid for paraxial beams—both geometric and diffractive within a 30° cone angle—and predicts good optical quality for the optical limiter of the present invention. The calculation also verifies the radiation patterns illustrated in FIG. 9B. Furthermore, the foregoing results are general and predict the same performance for any three mirror optical limiter satisfying the constraint set forth in equation (2).

Therefore, for applications requiring a wide angular field of view, a spherically-shaped sacrificial mirror 18S may be incorporated as an element of the optical train of the broadband optical limiter 10. This may be accomplished by substituting the spherically-shaped sacrificial mirror 18S into the optical limiter 10 embodiment illustrated in FIG. 1. A broadband optical limiter 10 having a wide field of view may be readily installed in front of the associated sensor system SS. The spherically-shaped sacrificial mirror 18S may be formed by placing a flat hybrid structure, as described hereinabove, into a sealed container and applying pressure to one side of the structure.

Other embodiments of the broadband optical limiter may be used in combination with sensor systems. For example, the optical trains illustrated in FIGS. 8A, 9A depict alternate embodiments for the broadband optical limiter. An entrance lens (not shown) could be utilized to collimate the incident radiation IR. The first reflective member 16 is operative to turn the collimated incident radiation out of the field of view of the associated sensor system. The lens 14 is operative to focus the turned radiation onto the sacrificial mirror (18F or 18S) which operates in the manner disclosed hereinabove. Focused radiation having intensity levels below the activation threshold of the sacrificial mirror is reflected back through the lens 14 to the second reflective member 22 which is operative to turn the radiation back into the field of view of the associated sensor system. Since the radiation incident upon these embodiments of the broadband optical limiter has been collimated by the entrance lens, the exit lens described hereinabove for the embodiment of FIG. 1 may be eliminated from the optical train since the lens 14 is operative to recollimate radiation reflected by the sacrificial mirror.

The foregoing embodiments of the broadband optical limiter have been stand alone units. The broadband optical limiter of the present invention may also be integrally incorporated into the optical train of the sensor system. For example, the embodiments of the broadband optical limiter illustrated described with respect to FIGS. 1, 8A, 9A may be integrated into a sensor system optical train at a position where the radiation is collimated. Such integration would eliminate the need for the entrance lens for the embodiments of FIGS. 8A, 9A described in the preceding paragraph.

Figure 11A:
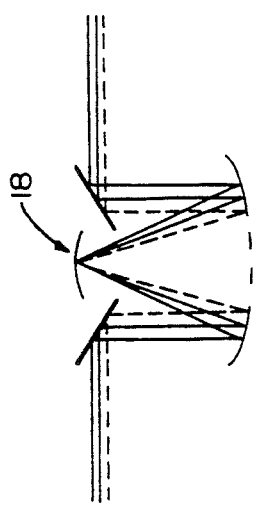
FIGS. 11A, 11B, 11C are plan views illustrating the optical paths for alternate embodiments of the broadband optical limiter.
Figure 11B:
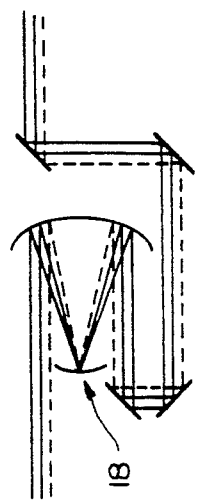
Figure 11C:
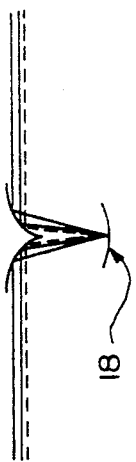

The embodiments of the broadband optical limiter described hereinabove have utilized transmissive optics in combination with reflective optics. The operating bandwidth of the optical limiter according to the present invention may be expanded by utilizing only reflective optics. For example, one or two parabolic or toroidal mirrors may be utilized in the broadband optical limiter embodiment illustrated in FIG. 1. Each parabolic or toroidal mirror would be operative to provide the combined functions of focusing and turning incident radiation, and therefore may be used to replace the aperture lens/first reflective member and/or the second reflective member/exit lens combinations, as exemplarily illustrated in FIGS. 11A, 11B, 11C. Spherical mirrors or optical diffraction gratings may also be utilized in the optical train of the broadband optical limiter.

The reliability of the broadband optical limiter according to the present invention is very high. The only component whose reliability could vary with time is the sacrificial mirror. Qualitative testing of sacrificial mirrors has shown that storage does not significantly effect the characteristics of the sacrificial mirror. Maintenance is likewise easy due to the lack of moving parts. For those embodiments of the broadband optical limiter that include means to reposition the sacrificial mirror after laser irradiation, maintenance of the means should be fairly straightforward. The repositioning means does not significantly reduce the reliability of the optical limiter embodiments including same.

Although this invention has been shown and described with respect to detailed embodiments thereof, it will be understood by those skilled in the art that various changes in form and detail thereof may be made without departing from the spirit and scope of the claimed invention.

What is claimed is:

1. A broadband optical limiter for use in combination with a sensor system having a predefined field of view, the sensor system being responsive to electromagnetic radiation in a predefined operating spectral band and being susceptible to disablement by laser radiation exceeding a predefined damage threshold, said broadband optical limiter comprising:

first optical means for focusing electromagnetic radiation and laser radiation in the predefined operating spectral band of the sensor system at a predefined focal plane, said first spectral means being further operative to turn the electromagnetic radiation and laser radiation being focused out of the field of view of the sensor system;

sacrificial mirror means positioned at said focal plane for reflecting the electromagnetic radiation focused and turned by said first optical means, said sacrificial mirror means being further operative to be optically machined by laser radiation focused and turned by said first optical means that has an intensity level at least as great as the predefined damage threshold of the sensor system to form a reflective dead spot in said sacrificial mirror means wherein the laser radiation is transmitted through said reflective dead spot of said sacrificial mirror means, and wherein said sacrificial mirror means is a hybrid structure including a substrate formed from a plastic material selected from the group of plastic materials consisting of phenolics, polystyrenes, polycarbonates, and polypropylenes so that said plastic material has a pck value no greater than about 0.049 wherein p is the density of said plastic material, c is the heat capacity of said plastic material and k is the thermal conductivity of said plastic material, and a metallic coating applied to one side of said substrate, said metallic coating being formed from at least one metallic material selected from the group consisting of gold, bismuth, chromium, silver, zinc, and platinum to provide relatively uniform reflectivity across the predefined spectral operating band of the sensor system, and wherein said hybrid structure is orientated so that electromagnetic radiation and laser radiation focused and turned by said first optical means is incident upon said metallic coating of said hybrid structure;

second optical means operative in response to electromagnetic radiation reflected by said sacrificial mirror means for turning the electromagnetic radiation back into the field of view of the sensor system; and detection/alarm means for detecting laser radiation transmitted through said reflective dead spot optically machined in said sacrificial mirror means and for providing an alarm signal in response to detection of laser radiation transmitted through said sacrificial mirror means;

wherein said broadband optical limiter is operative to throughput electromagnetic radiation in the predefined operating spectral band of the sensor system and to bock laser radiation having an intensity level at least as great as the predefined damage threshold of the sensor system.

2. The broadband optical limiter of claim 1 wherein said second optical means is further operative for collimating the turned electromagnetic radiation from said sacrificial mirror means prior to transmitting the electromagnetic radiation to the sensor system.

3. The broadband optical limiter of claim 2 wherein said second optical means comprises a second reflective member positioned to receive the electromagnetic radiation reflected by said sacrificial mirror means and to turn the received electromagnetic radiation back into the field of view of the sensor system.

4. The broadband optical limiter of claim 3 wherein said second optical means further comprises an exit lens operative to collimate the electromagnetic radiation turned by said second reflective member.

5. The broadband optical limiter of claim 1 wherein said hybrid member has a predetermined activation threshold wherein laser radiation exceeding the predefined damage threshold of the sensor system optically machines said reflective dead spot in said hybrid member.

6. The broadband optical limiter of claim 5 wherein said broadband optical limiter has a predetermined optical gain based upon said first optical means and wherein said predetermined activation threshold of said hybrid member is equal to the predefined damage threshold of the sensor system times said predetermined optical gain of said broadband optical limiter.

7. The broadband optical limiter of claim 1 wherein said sacrificial mirror means is a structurally flat hybrid member comprising a substrate and a metallic coating applied to one side of said substrate.

8. The broadband optical limiter of claim 1 wherein said first optical means comprises an aperture lens operative to focus electromagnetic radiation and laser radiation in the predetermined operating spectral band of the sensor system at said predetermined focal plane and a first reflective member disposed in combination with said aperture lens to turn the focused electromagnetic radiation and laser radiation in the predetermined operating spectral band of the sensor system out of the field of view of the sensor system.

9. The broadband optical limiter of claim 8 wherein said aperture lens is an achromatic lens.

10. The broadband optical limiter of claim 1 further comprising means disposed in combination with said sacrificial mirror means and operative after cessation of optical machining by laser radiation exceeding the predefined damage threshold for repositioning said sacrificial mirror means to remove said reflective dead spot of said sacrificial mirror means from the optical path of said broadband optical limiter.

11. The broadband optical limiter of claim 1 wherein said sacrificial mirror means is a spherically shaped hybrid member comprising a substrate and a metallic coating applied to one side of said substrate.

12. The broadband optical limiter of claim 11 wherein said first optical means has a predetermined focal length, and further wherein said spherically shaped hybrid member has a predetermined focal length that is equal to one-half of said predetermined focal length of said first optical means.

13. A broadband optical limiter for use in combination with a sensor system having a predefined field of view, the sensor system being responsive to electromagnetic radiation in a predefined operating spectral band and being susceptible to disablement by laser radiation exceeding a predefined damage threshold, said broadband optical limiter comprising:

first optical means for focusing electromagnetic radiation and laser radiation in the predefined operating spectral band of the sensor system at a predefined focal plane, said first spectral means being further operative to turn the electromagnetic radiation and laser radiation being focused out of the field view of the sensor system;

sacrificial mirror means positioned at said focal plane for reflecting the electromagnetic radiation focused and turned by said first optical means, said sacrificial mirror means being further operative to be optically machined by laser radiation focused and turned by said first optical means that has an intensity level at least as great as the predefined damage threshold of the sensor system to form a reflective dead spot in said sacrificial mirror means wherein the laser radiation is transmitted through said reflective dead spot of said sacrificial mirror means, and wherein said sacrificial mirror means is a hybrid structure including a mirror, a layer of carbon applied to one side of said mirror, and a metallic overcoating applied to said carbon layer, said metallic overcoating being formed from at least one metallic material selected from the group consisting of gold, bismuth, chromium, silver, zinc, and platinum to provide a relatively uniform reflectivity across the predefined operating spectral band of the sensor system, and wherein said hybrid structure is orientated so that electromagnetic radiation and laser radiation focused and turned by said first optical means is incident upon said metallic coating of said hybrid structure; and second optical means operative in response to electromagnetic radiation reflected by said sacrificial mirror means for turning the electromagnetic radiation back into the field of view of the sensor system;

wherein said broadband optical limiter is operative to throughput electromagnetic radiation in the predefined operating spectral band of the sensor system and to block laser radiation having an intensity level at least as great as the predefined damage threshold of the sensor system.

* * * * *